US008618782B2

United States Patent
Li et al.

(10) Patent No.: US 8,618,782 B2
(45) Date of Patent: Dec. 31, 2013

(54) MEANS AND ASSOCIATED METHODS FOR DIGITALLY CONTROLLING CONVERTER SYSTEMS

(75) Inventors: Xiaoming Li, Hangzhou (CN); Yunping Lang, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 85 days.

(21) Appl. No.: 13/218,355

(22) Filed: Aug. 25, 2011

(65) Prior Publication Data

US 2012/0049809 A1 Mar. 1, 2012

(30) Foreign Application Priority Data

Aug. 26, 2010 (CN) .......................... 2010 1 0263752

(51) Int. Cl.
*G05F 1/00* (2006.01)
(52) U.S. Cl.
USPC ........................................................ 323/283
(58) Field of Classification Search
USPC ................. 323/234, 241, 265, 322, 271–274,
323/280–284, 351; 363/74
See application file for complete search history.

(56) References Cited

U.S. PATENT DOCUMENTS

| 2007/0069707 A1* | 3/2007 | Miyashita et al. | 323/284 |
| 2008/0252280 A1* | 10/2008 | Prodic et al. | 323/283 |
| 2008/0303501 A1* | 12/2008 | Prodic | 323/283 |

* cited by examiner

*Primary Examiner* — Timothy J Dole
*Assistant Examiner* — Carlos Rivera-Perez
(74) *Attorney, Agent, or Firm* — Perkins Coie, LLP

(57) ABSTRACT

The embodiments of the present invention illustrate a means for digitally controlling a converter system and associated method. Wherein the means for digitally controlling a converter system comprises a means for generating a digital error signal according to an output voltage of the converter system and a reference voltage, a means for generating a digital control signal according to a digital reference signal and the digital error signal, and a means for generating a PWM signal according to the digital control signal in order to control the converter system. The means for digitally controlling a converter system and associated method at least alleviate the problem of limit-cycle oscillation, and promote the performance of system transient response and accuracy.

15 Claims, 9 Drawing Sheets

MEANS AND ASSOCIATED METHODS FOR DIGITALLY CONTROLLING CONVERTER SYSTEMS

CROSS-REFERENCE TO RELATED APPLICATION(S)

This application claims priority to and the benefit of Chinese patent application No. 201010263752.9, filed on Aug. 26, 2010, which is incorporated herein by reference in its entirety.

TECHNICAL FIELD

The present invention relates to converter systems, and more particularly relates to digitally controlled converter systems.

BACKGROUND

Nowadays, a digitally controlled converter system is widely favored because of its unique advantages such as advanced control algorithm, strong communication ability and high anti-disruption ability. The digitally controlled converter system comprises digital modules such as analog to digital converter (ADC) and digital pulse width modulator (DPWM). As shown in FIG. 1, generally, if the DPWM's resolution $N_{DPWM}$ is lower than the ADC's resolution $N_{ADC}$, or in other words, a voltage $\Delta V_{DPWM}$ generated from a least significant bit (LSB) of a DPWM is larger than a voltage $\Delta V_{ADC}$ generated from a LSB of an ADC, the voltage difference between an output voltage Vo lead from a LSB of the DPWM and a reference voltage $V_{REF}$ will be larger than the minimum change $\Delta V_{ADC}$ that can be detected by the ADC. As a result, the system may fail to regulate the output voltage $V_O$ and the output voltage $V_O$ keeps oscillating around the reference voltage $V_{REF}$. This phenomenon is called limit-cycle oscillation which may lead the output voltage $V_O$ to oscillate within a relatively large amplitude. It is hard to distinguish and compensate the noise disturbance from output voltage $V_O$ and the electro magnetic interference (EMI) from the converter system. Accordingly, the DPWM resolution $N_{DPWM}$ must be higher than the ADC resolution $N_{ADC}$ n order to avoid the limit-cycle oscillation.

Generally, the DPWM structure is based on a counter. The DPWM resolution of this structure is related to the system clock frequency. Taking a counter-based DPWM in buck converter as an example, the output voltage generated by a LSB of the DPWM is:

$$\Delta V_O = V_{in} \cdot \Delta D = V_{in} \cdot f_{SW}/f_{clock}$$

Wherein, $V_{in}$ in is input voltage of the system; ΔD is the resolution of the duty cycle; $f_{SW}$ is the switching frequency of the buck converter; and $f_{clock}$ is the system clock frequency.

In the practical application field, the trend is more and more obvious that switching frequency is required to be high. Generally the switching frequency is higher than 500 KHz. Unfortunately, since the system cost will greatly arise if the system clock frequency $f_{clock}$ is higher than 200 MHz, the system clock frequency in the system is generally lower than 200 MHz. Hence, the output voltage $\Delta V_O$ generated by a LSB of a DPWM is relatively high, or the DPWM resolution is relatively low. For an example, supposing the switching frequency $f_{SW}$=500 KHz, the system clock frequency $f_{clock}$=200 MHz, the system input voltage $V_{in}$=12V, then the output voltage $\Delta V_O$ generated from a LSB of the DPWM is 30 mV.

For a typical digitally controller converter system, the output voltage is relatively large and the corresponding DPWM resolution is relatively low.

Besides, the resolution of ADC is lower than the resolution of DPWM in order to avoid the limit-cycle oscillation. If the resolution of DPWM is low, the resolution of ADC should be correspondingly lower. A relative low resolution of ADC will worsen the performance of system transient response and affect the accuracy of the output voltage.

Accordingly, improved devices or methods are required to address the above deficiencies.

BRIEF SUMMARY OF THE INVENTION

One embodiment of the present invention illustrates a means for digitally controlling a converter system, wherein the means for digitally controlling a converter system comprises a means for generating a digital error signal according to an output voltage of the converter system and a reference voltage, a means for generating a digital control signal according to a digital reference signal and the digital error signal, and a means for generating a pulse width modulator (PWM) signal according to the digital control signal in order to control the converter system.

Another embodiment of the present invention illustrates a method for digitally controlling a converter system, wherein the method comprises generating a digital error signal according to an output voltage of the converter system and a reference voltage, generating a duty-cycle signal according to a digital reference signal and the digital error signal and generating a PWM signal according to the digital duty-cycle signal in order to control the converter system.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
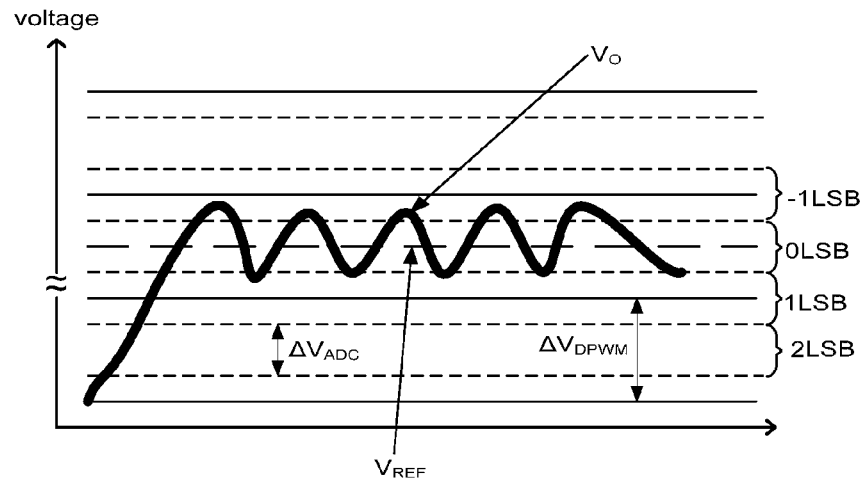
FIG. 1 shows a waveform diagram to illustrate the phenomenon of limit-cycle oscillation in the digitally controlled converter system as a prior art.
Figure 2:
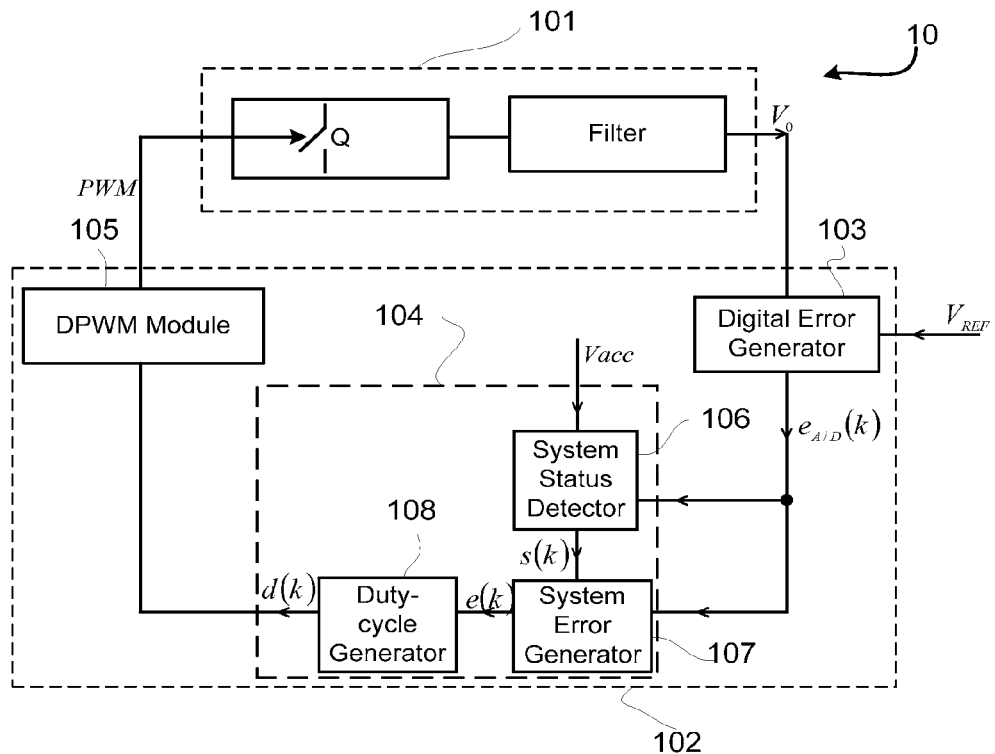
FIG. 2 illustrates a schematic block diagram of a digitally controlled converter system according to an embodiment of the present invention.

FIG. 2 illustrates a schematic block diagram of a digitally controlled converter system 10 according to an embodiment of the present invention. As shown in FIG. 2, digitally controlled converter system 10 comprises a converter circuit 101 and a digital controller 102. In one embodiment, the digital controller 102 comprises a digital error generator 103, a digital control signal generator 104 and a DPWM module 105. The converter circuit 101 comprises a switch Q and the PWM signal generated by the DPWM module 105 is supplied to a control end of the switch Q to regulate the output voltage $V_O$ of the converter circuit 101. In one embodiment, the switch is a metal oxide field effect transistor (MOSFET). Digital error generator 103 detects a difference between an output voltage $V_O$ of converter circuit 101 and a reference voltage $V_{REF}$ and converts the difference to a digital error signal $e_{A/D}(k)$. Digital control signal generator 104 is responsive to the digital error signal $e_{A/D}(k)$ and a digital reference signal $V_{acc}$ and operable to generate a digital control signal $d_k$. In one embodiment, digitally control signal generator 104 comprises a system status detector 106, a system error generator 107 and a digital duty-cycle generator 108. System status detector 106 responses to the digital error signal $e_{A/D}(k)$ and the digital reference signal $V_{acc}$, configured to detect the system status and to generate a system status signal s(k). In the illustrated embodiment, when the system is in stable status, s(k)=0. Whereas, when the system is in dynamic status, s(k)=1. However, one with ordinary skill in relevant art will understand that the system status signal s(k) may apply other values to represent the stable status and dynamic status. Then, system error generator 107 responses to the digital error signal $e_{A/D}(k)$ and the system status signal s(k), and is operable to generate a system error signal $e_{A/D}(k)$. Digital duty-cycle generator 108 responses to the signal e(k) and generates a digital duty-cycle signal d(k). By DPWM module 105, the digital duty-cycle signal d(k) is converted into a PWM signal to control converter circuit 101. Consequently the output voltage $V_O$ is regulated.

In certain embodiments, digital error generator 103 may physically be an ADC module. While digital control signal generator 104 and DPWM module 105 may physically be comprised in a micro control unit (MCU), a digital signal processing (DSP), a field-programmable gate array (FPGA) or other suitable digital apparatus. In other embodiments, for digital error generator 103, physically an ADC module may be responsible for quantizing the output voltage $V_O$ and the reference voltage $V_{REF}$, and a digital logic module such as micro computer unit (MCU), digital signal processor (DSP) and field-programmable gate array (FPGA) may be responsible for computing the digital error signal $e_{A/D}(k)$. However, one with ordinary skill in relevant art should understand that physically other suitable electric apparatus or their combination may be applied for comprising the elements of digital controller 102.

When the system is operating, the system status detector 106 firstly detects and decides the system status, and then correspondingly changes the system control mode. If the system initiates in steady status, the system error signal e(k) generated by system error generator 107 equals to zero (e(k) =0). Digital duty-cycle generator 108 generates a digital duty-cycle signal, and then the system control mode is converted into a steady control mode. The duty cycle signal is converted into a PWM signal by DPWM module 105 to control converter circuit 101, so that the output voltage $V_O$ is maintained near the reference voltage $V_{REF}$. As in the steady status, the value of $e_{A/D}(k)$ will be smaller than the digital reference signal $V_{acc}$. In one embodiments of the present invention, the digital reference signal $V_{acc}$ may be a positive integer smaller than the permitted error range of the system output voltage $V_O$. The steady control mode is applied when the system is in steady state. Here, despite the value of the digital error signal $e_{A/D}(k)$, the digital difference value between the regulated system output voltage $V_O$ and the reference voltage $V_{REF}$ is always smaller than $V_{acc}$. Therefore the limit-cycle oscillation is avoided.

If the system is in dynamic status, the system error signal e(k) outputted from system error generator 107 equals the digital error signal $e_{A/D}(k)$ (e(k)=$e_{A/D}(k)$). The system control mode is changed to a dynamic control mode. Duty-cycle generator 108 generates the digital duty-cycle signal d(k). When the system is in dynamic status, once the output voltage $V_O$ changes, digital controller 102 also changes the duty-cycle signal d(k) to regulate the output voltage $V_O$. In the dynamic status, digital controller 102 applies the dynamic control mode to regulate the output voltage $V_O$ in time, and limit-cycle oscillation will not occur.

Thus, through a preliminary determination of the system status as described above, digital controller 102 decides to apply a steady control mode or a dynamic control mode to regulate the output voltage $V_O$. Thus the limit-cycle oscillation is avoided.

In one embodiment, if the system is detected in dynamic status, the system control mode is changed into dynamic control mode immediately. And if the system is detected in steady status, digital duty-cycle generator 108 firstly generates a duty-cycle signal and afterward the control mode is changed into steady control mode.

Figure 3:
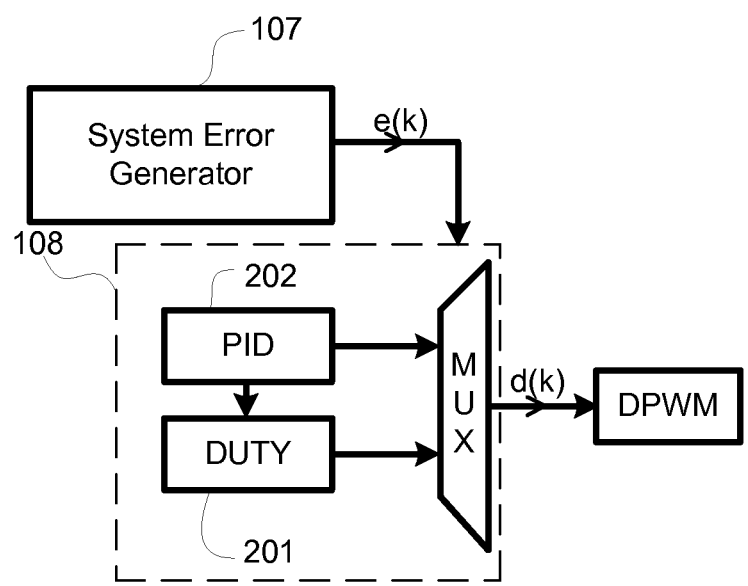
FIG. 3 illustrates a duty-cycle generator in the digitally controlled converter system shown in FIG. 2, according to an embodiment of the present invention.

FIG. 3 illustrates a structure scheme of duty-cycle generator 108 in digital controller 102 shown in FIG. 2 according to an embodiment of the present invention. As seen in FIG. 3, duty cycle generator 108 comprises a constant duty-cycle generator 201 and a real-time duty-cycle generator 202. When the system control mode is the steady control mode, the constant duty-cycle generator 201 is responsible for generating the digital duty-cycle signal. While the system control mode is the dynamic control mode, the real-time duty-cycle generator is responsible for generating the digital duty-cycle. In the embodiment shown in FIG. 3, constant duty-cycle generator 201 is a DUTY module and the real-time duty-cycle generator 202 is a 2nd-order proportion integration differentiation (PID) module. System error generator 107 firstly generates the system error signal e(k). When the system is detected in steady status (e(k)=0), the DUTY module, or in other words the constant duty-cycle generator 201 generates and outputs a constant duty-cycle signal D to DPWM module 104. When the system is detected in dynamic status, the PID module generates and outputs a real-time duty-cycle signal d(k) to DPWM module 105, wherein d(k)=d(k−1)+ae(k)+be(k−1)+ce(k−2)

The component of d(k−1) represents the real-time duty-cycle signal at the last moment k−1. The components of e(k), e(k−1), e(k−2) respectively represent the system error signals e(k) at the successive moments k, k−1 and k−2. And "a", "b", "c" are control factors of the 2nd-order PID. Where the moments such as k, K−1 and K−2 represent the quantified time.

Here below describes a method of how the DUTY module 202 generates the constant duty-cycle signal D according to an embodiment of the present invention. The DUTY module 202 receives the real-time duty-cycle signal d(k−1) at the last moment k−1, and the digital error signals $e_{A/D}(k-2)$, $e_{A/D}(k-1)$, $e_{A/D}(k)$ at the successive moments k−2, k−1 and k respectively. If the digital error signal generated by digital error generator 103 satisfies the following condition:

$$e_{A/D}(k)=e_{A/D}(k-1)=e_{A/D}(k-2)=0 \quad (1)$$

the received real-time duty-cycle signal d(k−1) at the last moment k−1 is considered to be the proper constant duty-cycle signal D, D=d(k−1)

One with ordinary skill in relevant art should understand that in the embodiment shown in FIG. 3, the real-time duty-cycle signal is generated by the 2nd-order PID module. However, in other embodiments, the real-time duty-cycle signal may be generated by an $m^{th}$-order compensation network, wherein m is a random positive integer. Similarly, the real-time duty-cycle signal may be decided by a variety of factors, such as the system error signals at the successive moments k−m, . . . ,k, the real-time duty-cycle signal at the last moment k−1 and the control factors of $m^{th}$-order compensation network. The condition of generating the constant duty-cycle signal is $e_{A/D}(k)=e_{A/D}(k-1)= \ldots =e_{A/D}(k-m)=0$ One with ordinary skill in relevant art should further understand that in the embodiment shown in FIG. 3, the real-time duty-cycle signal is generated by a PID module. However, in other embodiments, the real-time duty-cycle signal may be generated by other means with similar function, for example, a network with n poles and zeros in Z area.

In another embodiment, duty-cycle generator 108 shown in FIG. 2 only comprises a real-time duty-cycle generator but not a constant duty-cycle generator. The duty-cycle signal is generated by the real-time duty-cycle generator no matter whether the system is detected in stable or dynamic status. Taking a 2-order PID of compensation network as an example, once the system is detected in stable or dynamic status, the PID module generates a real-time duty-cycle signal d(k)=d(k−1)+ae(k)+be(k−1)+ce(k−2) and provides it to DPWM module 105.

In one embodiment of the present invention, the operational process flow of the system status detector 106 is described as following.

Supposing that the system initiates in dynamic status, if the output voltage $V_O$ is maintained in a certain range around the reference voltage $V_{REF}$ for a period $T_{dt}$, it is judged that the system enters into the stable status. Wherein the range described above satisfies that the digital error signal $e_{A/D}(k)$ provided by digital error generator 103 is maintained between −p to p, that is:

$$-p \leq e_{A/D}(k) \leq p \quad (2)$$

Wherein, p is a nonnegative integer that smaller than the digital reference signal $V_{acc}$. The value of p depends on the demand of system precision. In one embodiment, p=1.

Figure 4:
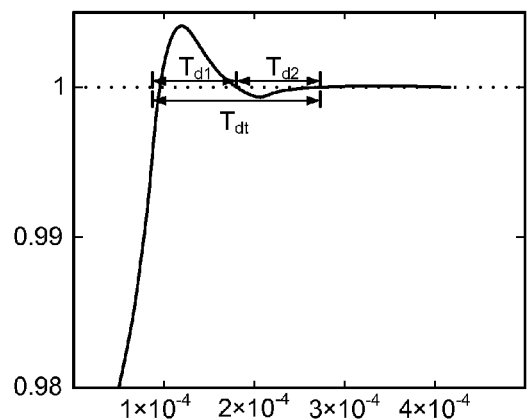
FIG. 4 illustrates a schematic unit-step response diagram in the digitally controlled converter system according to an embodiment of the present invention.

The period $T_{dt}$ described above may be larger than the damped oscillation period of the output voltage $V_O$. For certain embodiments, the worst-case condition is that the input voltage signal is a unit step signal. Therefore, once the period $T_{dt}$ is larger than the period of unit step response, $T_{dt}$ is larger than the damped oscillation period of the output voltage $V_O$ in any other condition. FIG. 4 illustrates a scheme of unit step response. As shown in FIG. 4, the period $T_{dt}$ is much larger than the maximum value of $T_{d1}$ and $T_{d2}$ that is:

$$T_{dt} >> T_{d1} \quad (3)$$

$$\text{and } T_{dt} >> T_{d2} \quad (4)$$

When the formulas (2), (3), and (4) are satisfied, the system enters into stable status.

On the other hand, supposing that the system initiates in steady status, once the output voltage $V_O$ is disturbed, it is judged that the system enters into dynamic status. In one embodiment, the method to detect the disturbance is that when the absolute value of the digital error signal $e_{A/D}(k)$ surpass over the range of $V_{acc}$, that is:

$$|e_{A/D}(k)| \geq V_{acc} \quad (5)$$

Then, it is judged that the disturbance of the output voltage $V_O$ occurs.

In another embodiment, if the variation of the digital error signal $e_{A/D}(k)$ compared with the digital error signal $e_{A/D}(k-1)$ at the last period is larger than a range q, that is:

$$|\Delta e_{A/D}(k)| > q \quad (6)$$

then, it is judged that disturbance of the output voltage $V_O$ occurs. Wherein, q is a positive integer.

One with ordinary skill in relevant art should understand that the above description about the method for judging the system status is schematic. However, in other embodiments, other methods may be applied for judging the system status.

Figure 5:
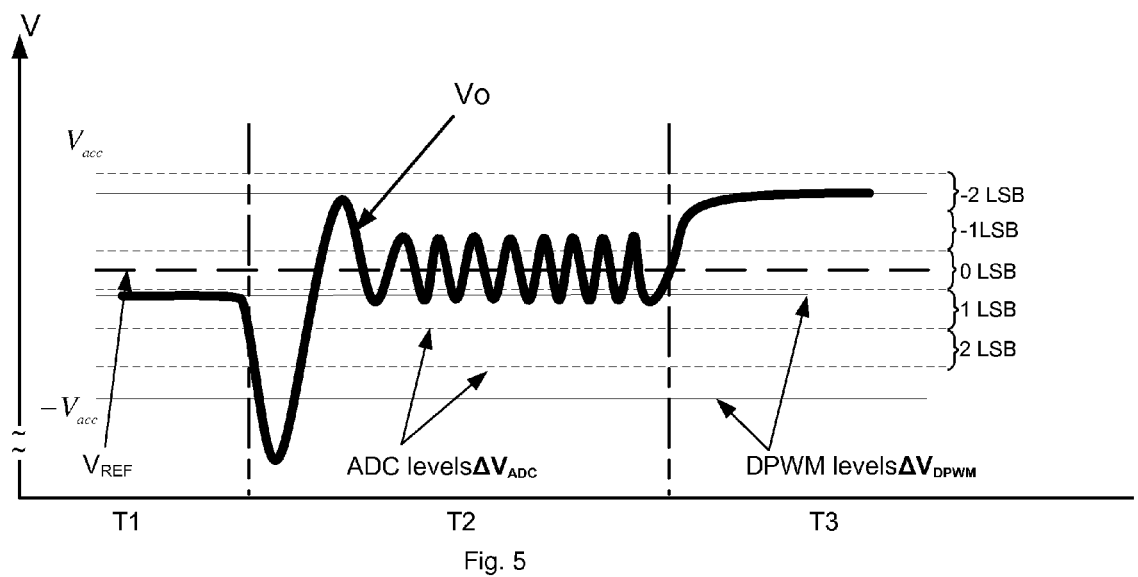
FIG. 5 shows an output voltage waveform of a digitally controlled converter system to illustrate the method of detecting the system status according to an embodiment of the present invention.

FIG. 5 illustrates a waveform diagram of the output voltage of the digitally controlled converter system 10 shown in FIG. 2 to illustrate a scheme of judging the system status according to an embodiment of the present invention. As shown in FIG. 5, during period T1, the system is in stable status and the system control mode is the steady control mode. The digital reference signal $V_{acc}$ is set near the reference voltage signal $V_{REF}$. The output voltage $V_O$ is between $-V_{acc}$ to $V_{acc}$. When period T2 is coming, the output voltage $V_O$ excesses the range of $|V_{acc}|$, so the output voltage $V_O$ satisfies that $|e_{A/D}(k)| \geq V_{acc}$ when disturbance occurs to the output voltage $V_O$. The system is detected in dynamic status and the control mode is converted to dynamic control mode. During period T2, the output voltage $V_O$ oscillates around the reference voltage $V_{REF}$. The digital error signal $e_{A/D}(k)$ is maintained between −1 to 1 for a period ($-1 \leq e_{A/D}(k) \leq 1$). When period T3 is coming, the system enters into the stable status again. The output voltage is in the range of digital reference signal $V_{acc}$. Duty-cycle generator 108 generates a digital duty-cycle signal and the system control mode is converted into the steady control mode.

Figure 6:
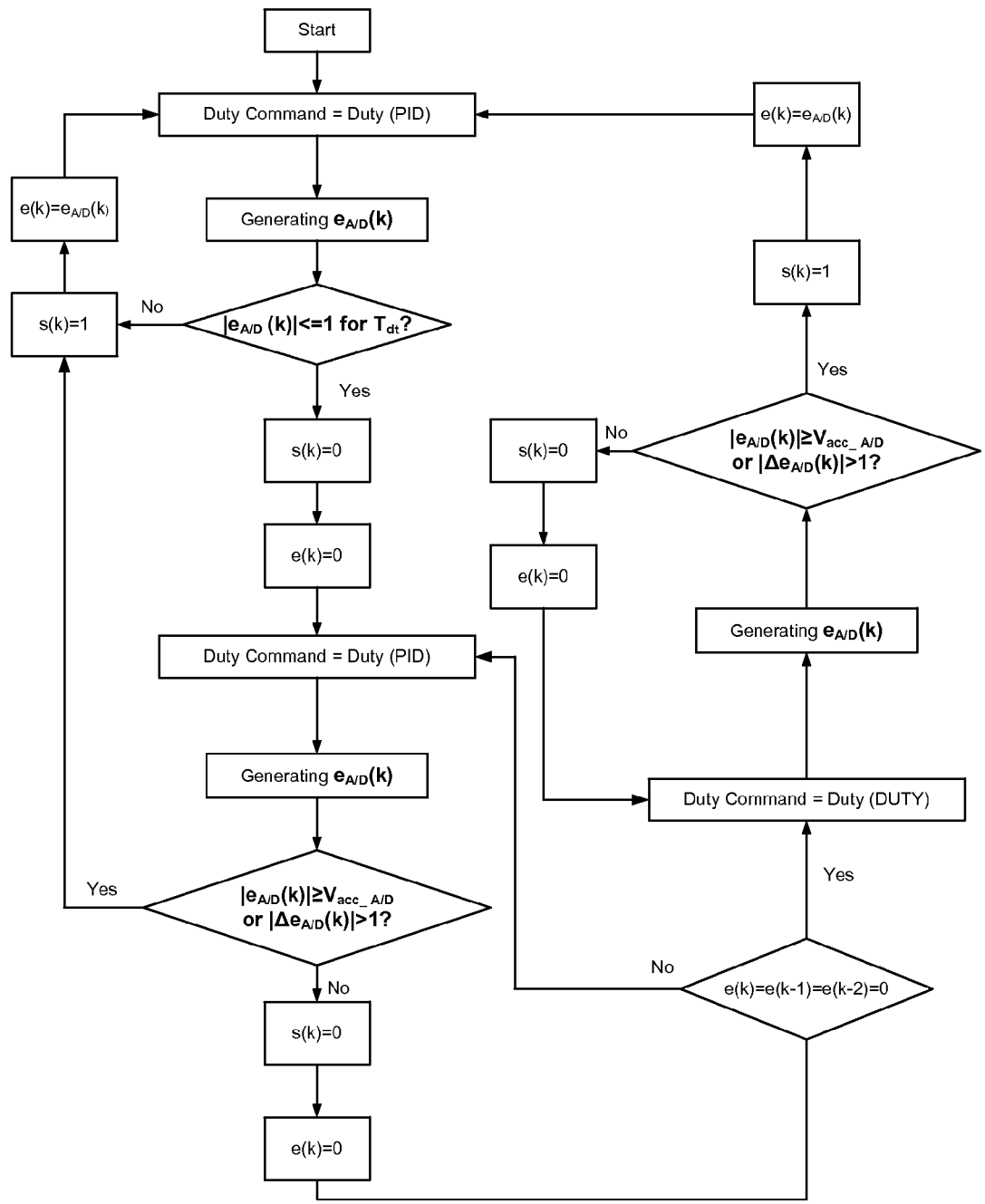
FIG. 6 illustrates a process flow diagram of digitally controlling a converter system according to an embodiment of the present invention.

FIG. 6 illustrates a work-flow diagram of a method for digitally controlling a converter system according to an embodiment of the present invention. As shown in FIG. 6, in each cycle, a digital error signal $e_{A/D}(k)$ is generated firstly. Then the system status is detected and judged through satisfying some conditions, and accordingly the system status signal s(k) and the system error signal e(k) are generated.

Later, a duty-cycle signal is generated according to the system error signal. Furthermore, a PWM signal is always generated by DPMW module 105 according to the generated duty-cycle signal (not shown in FIG. 6). Afterward, the system begins a new operating cycle.

When the system begins to operate, the real-time duty-cycle generator provides a real-time duty-cycle, and the system operates at dynamic control mode. In the illustrated embodiment, the constant duty-cycle generator is a DUTY module and the real-time duty-cycle generator is a proportion-integral-derivative (PID) module. Then, system status detector 106 detects whether the system is in stable status. If the system does not satisfy the conditions shown in formulas (2), (3), and (4) (wherein q=1), the system will still operate in the dynamic control mode; If the system satisfies the conditions shown in formulas (2), (3), and (4), the DUTY module will begin to seek the constant duty-cycle signal D. Wherein, once the DUTY module finds out that the system does not satisfy the constant duty-cycle condition shown in formula (1), the PID module will generate a real-time duty-cycle signal and the DUTY module will continue to look for the constant duty-cycle signal D. While once the DUTY module finds out that the system matches the constant duty-cycle condition shown in formula (1), the DUTY module provides a constant duty-cycle signal D. Afterward, the control mode is changed into the steady control mode, and system status detector 106 begins to judge whether the system enters into dynamic status. If the system doesn't match the dynamic conditions shown in formulas (5) and (6) (wherein q=1), the system will still operate at steady state control mode; if the system matches the dynamic conditions shown in formulas (5) and (6), the system enters into dynamic control mode immediately. At this time, the duty-cycle is provided by the PID module.

It should be noted that the steady conditions (formulas (2), (3) and (4) satisfied), dynamic conditions (formulas (5) and (6) satisfied) and constant duty-cycle generating condition (formula (1) satisfied) is schematic. In other embodiment, according to the requirement for system, other conditions may apply to judge.

It should also be noted that the digitally controlled converter system and its associated method according to the embodiments of the present invention may apply in a various types of converter system, such as buck converter system, boost converter system and other similar converter system.

Figure 7A:
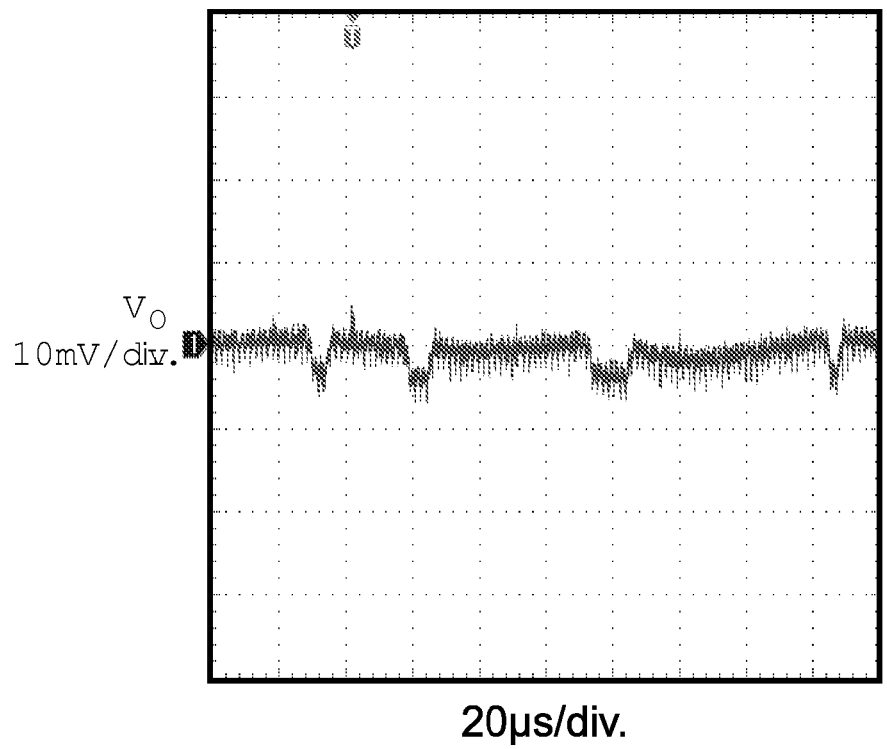
FIG. 7(a) illustrates an output voltage waveform diagram of a traditional digitally controlled converter system.
Figure 7B:
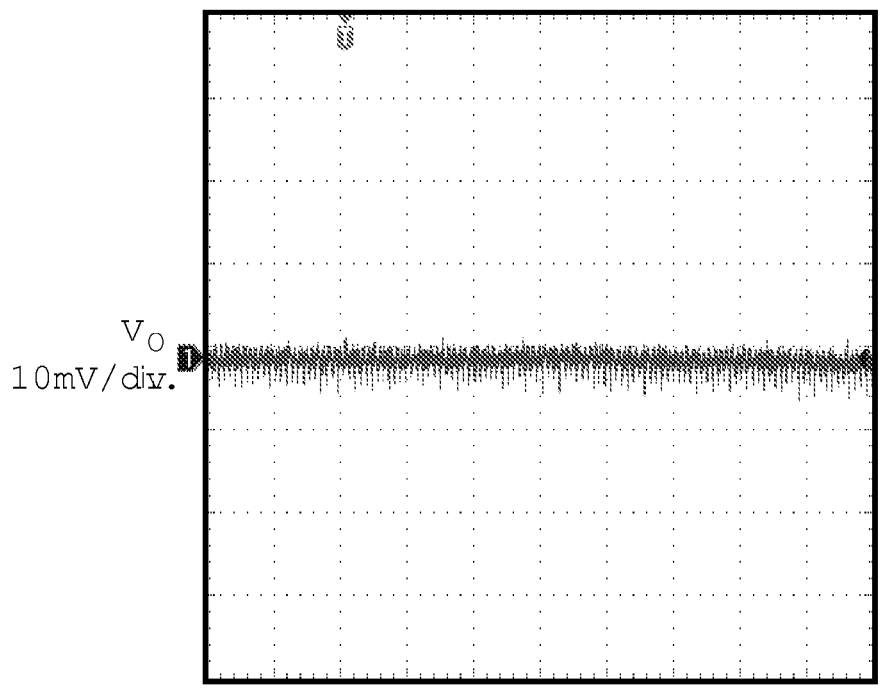
FIG. 7(b) illustrates an output voltage waveform diagram of the digitally controlled converter system according to an embodiment of the present invention.

FIG. 7-10 illustrates a group of experimental results according to an embodiment of the present invention. In the experiments, a buck converter is controlled. The program is implemented on the board of Xilinx Spantan3A FPGA with additional A/D device. System input voltage $V_{in}$=12V, output voltage $V_o$=3.3V, output current $I_o$=3A, switch frequency $f_{SW}$=586 kHz, sample frequency $f_S$=586 kHz and system clock frequency $f_{clock}$=150 MHz are adopted for these experiments. A PID serves as the real-time duty-cycle generator, wherein its bandwidth is 50 KHz, proportion parameter KP=0.433, integral parameter KI=2.033e4 and differential parameter KD=1.195e-5; for the DPWM and ADC, the voltage generated by a signal LSB is: $\Delta V_O$=15 mV, $\Delta V_{ADC}$=5 mV; the permitted variation range of the output voltage in steady status $\Delta V_{acc}$=25 mV;

FIG. 7(a) illustrates an experimental output voltage waveform diagram of a conventional digitally controlled converter system and associated method. FIG. 7(b) illustrates an experimental output voltage waveform diagram according to an embodiment of the present invention. Compared with FIG. 7(a), the limit-cycle oscillation that occurs in the conventional digitally controlled converter system does not occur in the new type of digitally controlled converter system with reference to FIG. 7(b) according to one embodiment of the present invention.

Figure 8:
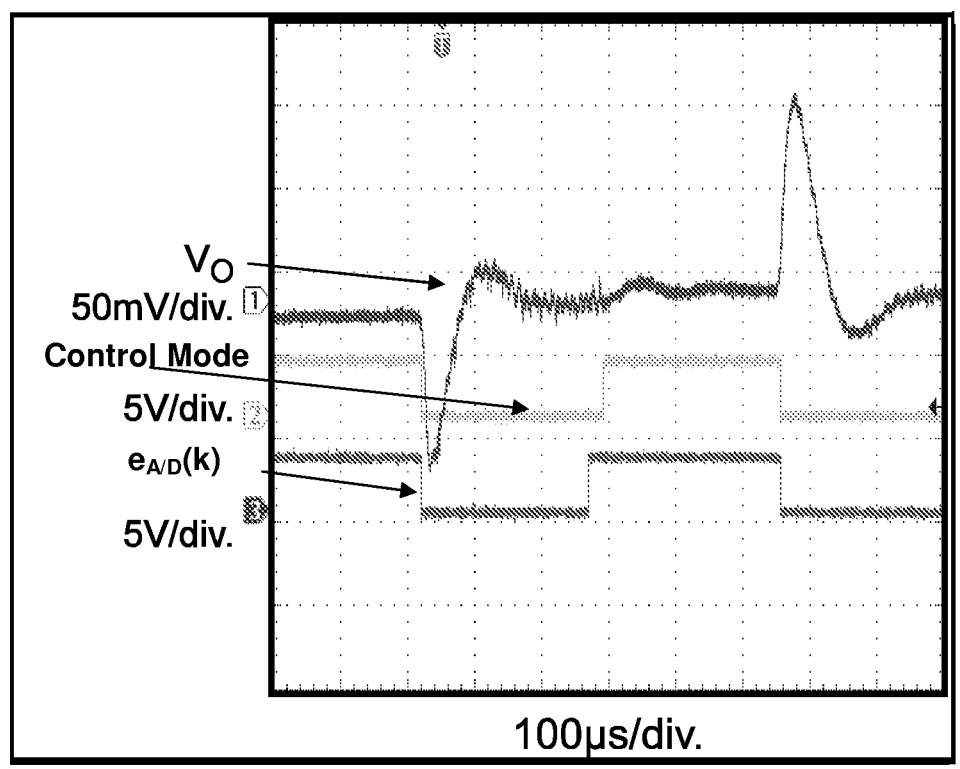
FIG. 8 illustrates a waveform diagram of the converting process of the system status and the system control mode according to an embodiment of the present invention.

FIG. 8 illustrates the process flow of the system status converting and the system control mode converting according to an embodiment of the present invention. As shown in FIG. 8, channel 1 is the waveform of the output voltage; channel 2 is the waveform of system control mode, wherein the high level represents the steady control mode, and the low level represents the dynamic control mode; channel 3 is the waveform of the system status, wherein the high level represents the steady status, and the low level represents the dynamic status. In FIG. 8, when the disturbance occurs in the output voltage $V_O$, the system is determined in dynamic status. Once the output voltage $V_O$ is maintained in a range near the reference voltage for a predetermined period, the system is determined in steady status. Seen in FIG. 8, the system control mode is converted to steady control mode after the system has been in the steady status for a period.

Figure 9A:
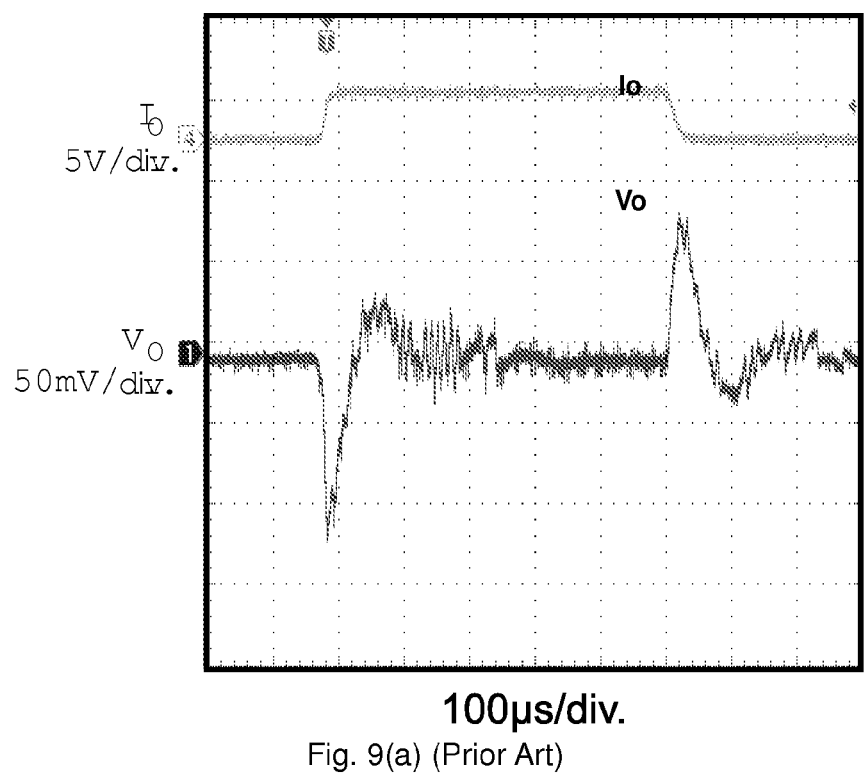
FIG. 9(a) illustrates a schematic diagram of the output voltage during transient response for a traditional digitally controlled converter system.
Figure 9B:
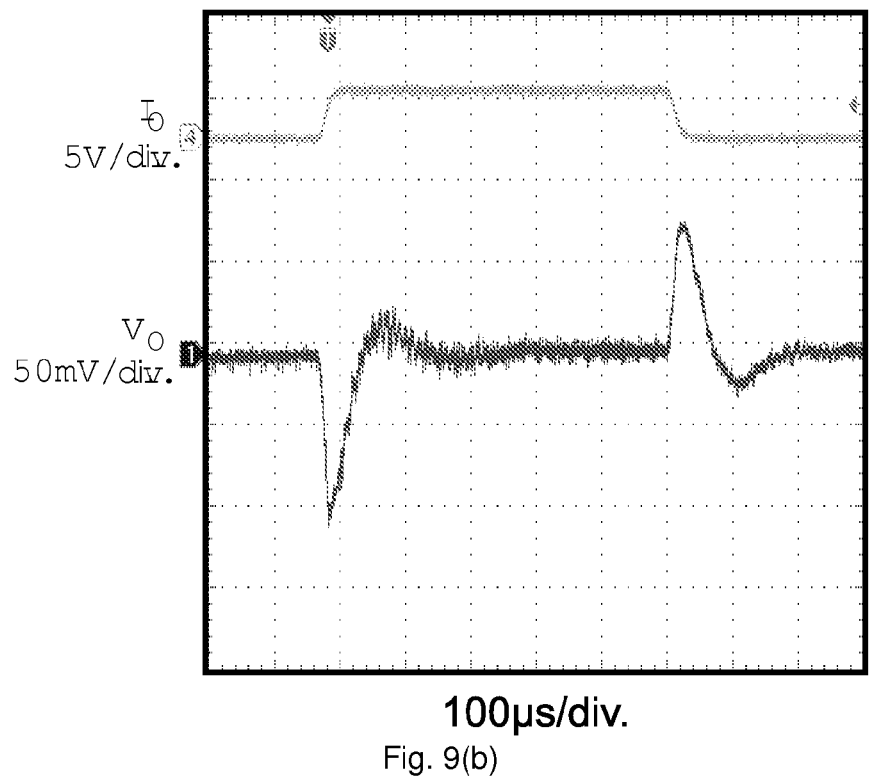
FIG. 9(b) illustrates a schematic diagram of the output voltage during transient response for a digitally controlled converter system according to an embodiment of the present invention.

FIG. 9(a) illustrates a transient response schematic diagram of the output voltage according to a conventional digitally controlled converter system and associated method. FIG. 9(b) illustrates a transient response schematic diagram of the output voltage according to an embodiment of the present invention. Comparing between FIGS. 9(a) and 9(b), it is seen that although the resolution of DPWM in the conventional digitally control converter system and the new type of digitally controlled converter system according to one embodiment of the present invention is consistent, the transient response performance of the system output voltage is improved since the resolution of ADC module is increased in the digitally controlled converter system according to the embodiment of the present invention.

Figure 10A:
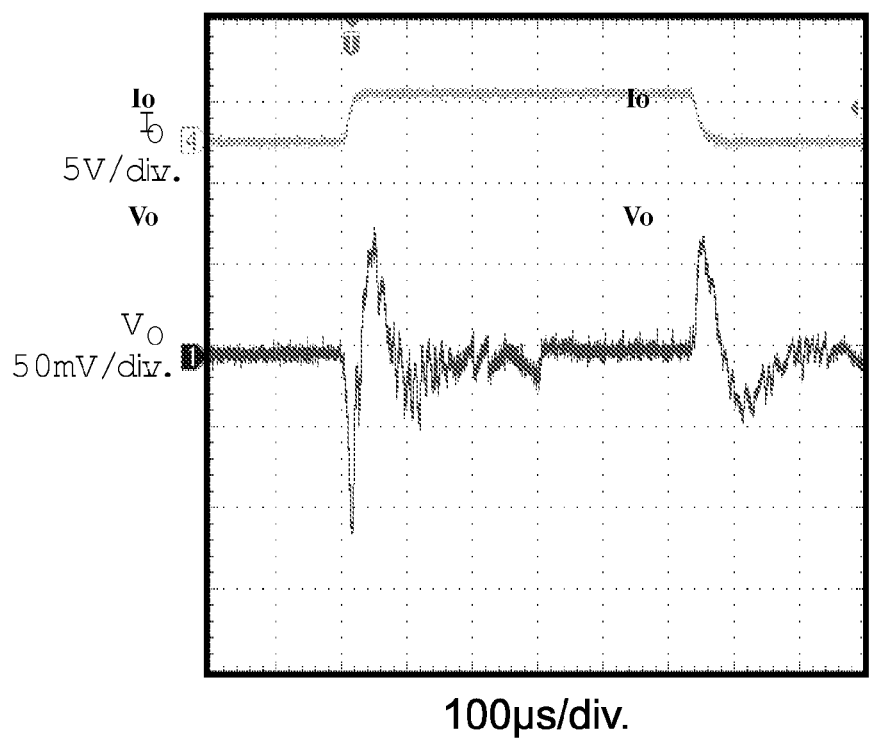
FIG. 10(a) illustrates an output voltage waveform diagram of a traditional digitally controlled converter system with a non-linear controller.
Figure 10B:
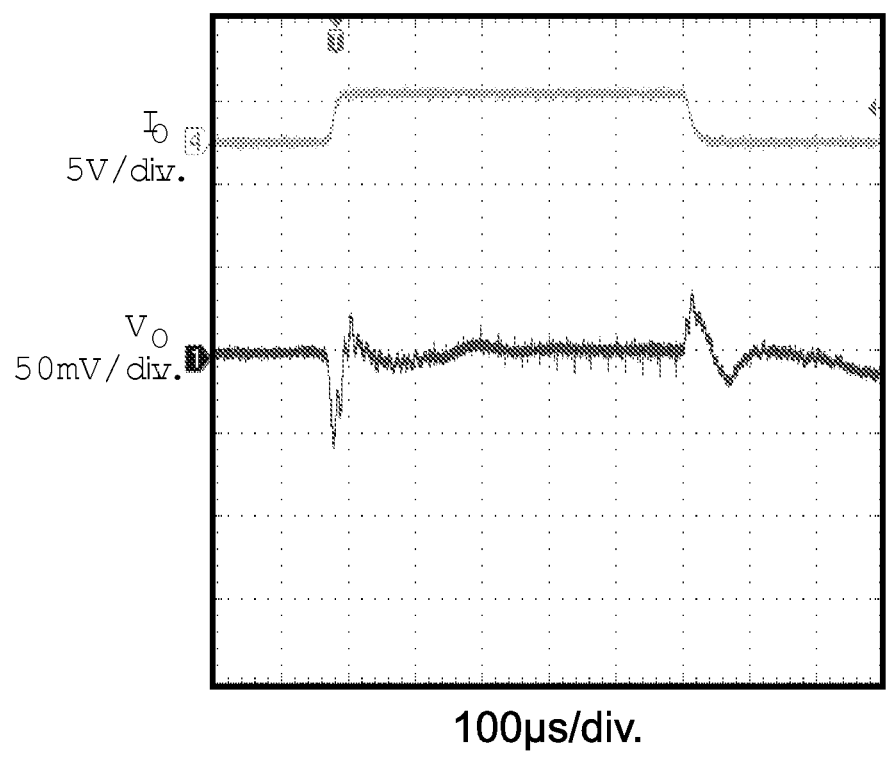
FIG. 10(b) illustrates an output voltage waveform diagram of a digitally controlled converter system with a non-linear controller according to an embodiment of the present invention.

FIG. 10(a) illustrates an output voltage waveform diagram of a non-linear controller in a conventional digitally controlled converter system. FIG. 10(b) illustrates an output voltage waveform diagram of a non-linear controller in a digitally controlled converter system according to an embodiment of the present invention. Compared with FIG. 10(a), it is concluded that when a non-linear controller is applied in a compensation network, the controller corresponding to FIG. 10(b) may detect a smaller output voltage error and response more sensitively than it in FIG. 10(a). This is because according to the embodiments of the present invention, the new type of digitally controlled converter system may apply an ADC module with a higher resolution.

The above experimental examples relating to FIGS. 7(a)-10(b) are for illustrative purpose only, and the feature(s) or advantage(s) the above examples disclose or imply comprise only part of the features and advantages pertaining to the present invention. Sometimes, the feature(s) or advantage(s) as illustrated with reference to FIGS. 7(a)-10(b) can not be shown in other instances since the result(s) may be affected by other factor(s) which may not be disclosed herein.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A means for digitally controlling a converter system, comprising:

error signal generating means for generating a digital error signal according to an output voltage of the converter system and a reference voltage;

control signal generating means for generating a digital control signal according to a digital reference signal and the digital error signal; and modulation signal generating means for generating a modulation signal according to the digital control signal, wherein the modulation signal is coupled to the converter system and is configured to regulate the output voltage of the converter system;

wherein the control signal generating means comprises:

system status means for detecting system status and generating a system status signal according to the digital error signal and the digital reference signal;

system error generating means for generating a system error signal according to the system status signal and the digital error signal; and duty-cycle generating means for generating a digital duty-cycle signal as the digital control signal according to the system error signal;

wherein the system status means is configured to generate:
a steady state signal at a first condition; and
a dynamic state signal at a second condition;
wherein the second condition is that an absolute difference between two digital error signals at two latest successive moments is larger than a second predetermined value.

2. The means for digitally controlling a converter system according to claim 1,
wherein the system error generating means is configured to generate the system error signal equal to zero when the steady state signal is generated; and
wherein the system error generating means is configured to generate the system error signal equal to the digital error signal when the dynamic state signal is generated.

3. The means for digitally controlling a converter system according to claim 1, wherein the first condition is that the absolute value of the digital error signal is maintained no more than a first predetermined value for a predetermined period, and wherein the first predetermined value is less than the digital reference signal.

4. The means for digitally controlling a converter system according to claim 1, wherein the duty-cycle generating means comprises a means for generating a real-time duty-cycle signal and a means for generating a constant duty-cycle signal.

5. The means for digitally controlling a converter system according to claim 4, wherein the means for generating the real-time duty-cycle signal is an mth-order compensation network, and wherein m is a natural number.

6. The means for digitally controlling a converter system according to claim 4, wherein the means for generating the real-time duty-cycle signal is an mth-order compensation network responsive to the system error signals at successive m moments and the duty-cycle signal at the last moment, operable to generate a duty-cycle signal for the present moment, and wherein m is a natural number.

7. The means for digitally controlling a converter system according to claim 1, wherein the duty-cycle generating means comprises:

an $m^{th}$-order compensation network, configured to generate a real-time duty-cycle signal, wherein m is a natural number; and a means for generating a constant duty-cycle signal, configured to generate the constant duty-cycle signal when the system error signals at the successive m moments all are equal to zero;

wherein the constant duty-cycle signal at the current moment remains the real-time duty-cycle signal at the last moment.

8. The means for digitally controlling a converter system according to claim 1, wherein the converter is a buck converter.

9. A method for digitally controlling a converter system, comprising:

generating a digital error signal according to an output voltage of the converter system and a reference voltage;

generating a duty-cycle signal according to a digital reference signal and the digital error signal; and generating a PWM signal according to the digital duty-cycle signal in order to control the output voltage of the converter system;

wherein generating a digital duty-cycle signal further comprises:

detecting the system status and generating a system status signal according to the digital error signal and the digital reference signal;

generating a system error signal according to the system status signal and the digital error signal; and generating the digital duty-cycle signal according to the system error signal;

wherein detecting the system status and generating a system status signal comprises:

generating a steady state signal if the system is at a first condition; and generating a dynamic state signal if an absolute difference between two digital error signals at two latest successive moments is larger than a second predetermined value.

10. The method according to claim 9, wherein the first condition is that the digital error signal is maintained smaller than a first predetermined value for a predetermined period.

11. The method according to claim 10,
wherein the second predetermined value is a positive integer, and the first predetermined value is a non-negative integer that is smaller than the digital reference signal.

12. The method according to claim 9, wherein generating a system error signal further comprises:

generating a signal equal to zero if the system status signal is a steady states signal; and generating a signal equal to the digital error signal if the system status signal is a dynamic status signal.

13. The method according to claim 12, wherein generating a digital duty-cycle signal comprises:

generating a real-time duty-cycle signal responsive to the system error signals at the a successive m moments $^{k-m,}$ . . . ,$k$ and the real-time duty cycle signal at the last moment k−1;

wherein m is a positive integer smaller than integer k.

14. The method according to claim 9, wherein generating a digital duty-cycle signal comprising: generating a constant digital duty-cycle signal if the system error signals at the successive m moments all are equal to zero; and generating a real-time digital duty-cycle signal if the system status signal is a dynamic status signal.

15. A converter system, comprising:
a converter circuit, comprising a switch, wherein the converter circuit is configured to generate an output voltage;
a controller, comprising:

a digital error signal generator, configured to generator a digital error signal according to the output voltage and a reference voltage;

a digital control signal generator, configured to generate a digital control signal according to the digital error signal and a digital reference signal; and a digital modulation module, configured to generate a modulation signal to the switch to regulate the output voltage;

wherein the digital control signal generator further comprises:

a system status detector;

a system error generator, configured to output the digital error signal when the system status signal is in the first status and output zero when the system status signal is in the second status; and a digital duty-cycle generator, configured to output real-time duty cycle signal and a constant duty-cycle signal according to the output of the system error generator;

wherein the system status detector is configured to generate:

a steady state signal as the system status signal at a first status; and a dynamic state signal as the system status signal at a second status;

wherein the second status is that an absolute difference between two digital error signals at two latest successive moments is larger than a second predetermined value.

* * * * *